US012433669B2

(12) United States Patent
Staid et al.

(10) Patent No.: US 12,433,669 B2
(45) Date of Patent: Oct. 7, 2025

(54) MATERIAL REMOVAL FROM SURGICAL SITE

(71) Applicant: PROCEPT BioRobotics Corporation, Redwood City, CA (US)

(72) Inventors: Kevin Staid, Lowell, MA (US); Surag Mantri, East Palo Alto, CA (US)

(73) Assignee: PROCEPT BioRobotics Corporation, San Jose, CA (US)

( * ) Notice: Subject to any disclaimer, the term of this patent is extended or adjusted under 35 U.S.C. 154(b) by 930 days.

(21) Appl. No.: 17/310,825

(22) PCT Filed: Mar. 9, 2020

(86) PCT No.: PCT/US2020/021702
§ 371 (c)(1),
(2) Date: Aug. 25, 2021

(87) PCT Pub. No.: WO2020/181278
PCT Pub. Date: Sep. 10, 2020

(65) Prior Publication Data
US 2022/0117651 A1    Apr. 21, 2022

Related U.S. Application Data

(60) Provisional application No. 62/815,328, filed on Mar. 7, 2019.

(51) Int. Cl.
*A61B 18/00* (2006.01)
*A61B 18/14* (2006.01)

(52) U.S. Cl.
CPC .. *A61B 18/149* (2013.01); *A61B 2018/00208* (2013.01); *A61B 2018/00327* (2013.01);
(Continued)

(58) Field of Classification Search
CPC ........ A61B 2218/001; A61B 2218/002; A61B 2218/003; A61B 2218/007; A61B 17/3203; A61B 2017/32032
See application file for complete search history.

(56) References Cited

U.S. PATENT DOCUMENTS 4,389,071 A    6/1983  Johnson, Jr.
5,254,117 A *  10/1993 Rigby ................... A61M 1/774
                                                     606/49
(Continued)

FOREIGN PATENT DOCUMENTS

CN    101394877    3/2009
CN    102905633    1/2013
(Continued)

OTHER PUBLICATIONS

International Search Report and Written Opinion for PCT/US2020/021702, 14 pages (Jul. 15, 2020).

*Primary Examiner* — Linda C Dvorak
*Assistant Examiner* — Nicholas S Borsch
(74) *Attorney, Agent, or Firm* — Knobbe, Martens, Olson & Bear, LLP

(57) ABSTRACT

A fluid source on a carrier is configured to rotate relative to a probe to direct a fluid stream from the source toward an opening of an evacuation lumen. This may help to remove material that may collect near the opening, such as blood clots and tissue. Also, directing the fluid stream toward the evacuation lumen can draw flowable material from the surgical site toward the evacuation lumen to improve removal of material from the surgical site.

16 Claims, 7 Drawing Sheets

(52) U.S. Cl.
CPC ............... *A61B 2018/00351* (2013.01); *A61B 2018/00404* (2013.01); *A61B 2018/0044* (2013.01); *A61B 2018/00446* (2013.01); *A61B 2018/00452* (2013.01); *A61B 2018/00488* (2013.01); *A61B 2018/00494* (2013.01); *A61B 2018/00511* (2013.01); *A61B 2018/00517* (2013.01); *A61B 2018/00529* (2013.01); *A61B 2018/00541* (2013.01); *A61B 2018/00547* (2013.01); *A61B 2018/00559* (2013.01); *A61B 2018/00595* (2013.01); *A61B 2018/00601* (2013.01); *A61B 2018/00863* (2013.01); *A61B 2018/00982* (2013.01); *A61B 2018/00994* (2013.01); *A61B 2218/002* (2013.01); *A61B 2218/007* (2013.01)

(56) References Cited

U.S. PATENT DOCUMENTS

| | | | |
|---|---|---|---|
| 5,496,267 | A | 3/1996 | Drasler |
| 6,032,673 | A * | 3/2000 | Savage ............ A61B 18/1485 606/41 |
| 6,375,635 | B1 | 4/2002 | Moutafis |
| 2002/0038130 | A1 | 3/2002 | Adams |
| 2003/0009166 | A1 | 1/2003 | Moutafis |
| 2003/0014047 | A1 | 1/2003 | Woloszko |
| 2004/0230211 | A1 | 11/2004 | Moutafis |
| 2006/0100569 | A1 * | 5/2006 | McRury ............ A61B 17/32037 604/22 |
| 2006/0118495 | A1 | 6/2006 | Kondratalv |
| 2007/0244353 | A1 * | 10/2007 | Larsen ............... A61B 1/126 600/105 |
| 2010/0010294 | A1 | 1/2010 | Conlon |
| 2010/0010524 | A1 | 1/2010 | Barrington |
| 2011/0184391 | A1 | 7/2011 | Aljuri |
| 2013/0211317 | A1 | 8/2013 | Solem |
| 2016/0100852 | A1 * | 4/2016 | Hyde .................. A61B 5/0077 600/309 |
| 2017/0216503 | A1 | 8/2017 | Look |
| 2017/0231605 | A1 | 8/2017 | Aljuri |
| 2018/0263467 | A1 | 9/2018 | Takahashi |
| 2018/0263647 | A1 | 9/2018 | Aljuri |
| 2019/0046223 | A1 * | 2/2019 | Dayton ................ A61B 1/015 |

FOREIGN PATENT DOCUMENTS

| | | |
|---|---|---|
| JP | 2002543913 | 12/2002 |
| JP | 2003519525 | 6/2003 |
| WO | 0069348 | 11/2000 |
| WO | 2004004914 | 1/2004 |
| WO | 2008083407 | 7/2008 |
| WO | 2009111736 | 9/2009 |
| WO | 2010006564 | 1/2010 |
| WO | 2011097505 | 8/2011 |
| WO | 2013130895 | 9/2013 |
| WO | 2014127242 | 8/2014 |
| WO | 2014165703 | 10/2014 |
| WO | 2015035249 | 3/2015 |
| WO | 2015200538 | 12/2015 |
| WO | 2016004071 | 1/2016 |
| WO | 2016037132 | 3/2016 |
| WO | 2016037137 | 3/2016 |
| WO | 2017161331 | 9/2017 |
| WO | 2019032986 | 2/2019 |
| WO | 2019246580 | 12/2019 |
| WO | 2020180724 | 9/2020 |
| WO | 2020181278 | 9/2020 |
| WO | 2020181280 | 9/2020 |
| WO | 2020181281 | 9/2020 |
| WO | 2020181290 | 9/2020 |
| WO | 2021096741 | 5/2021 |

* cited by examiner

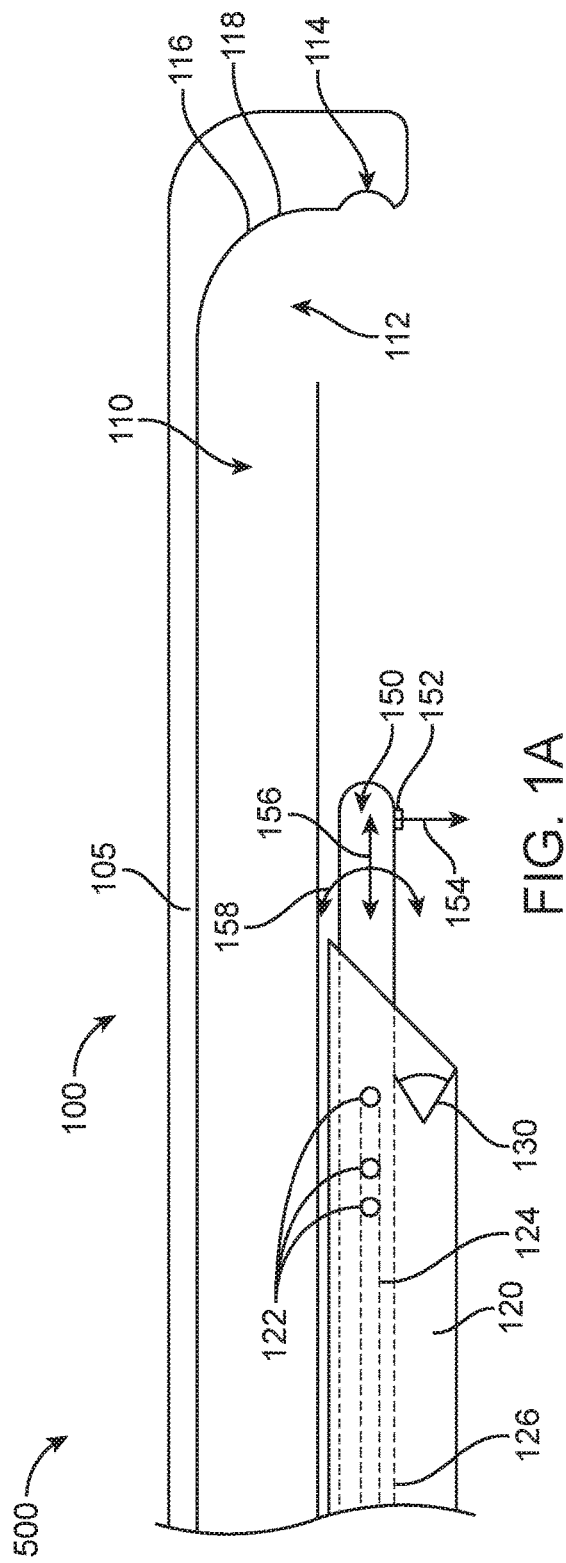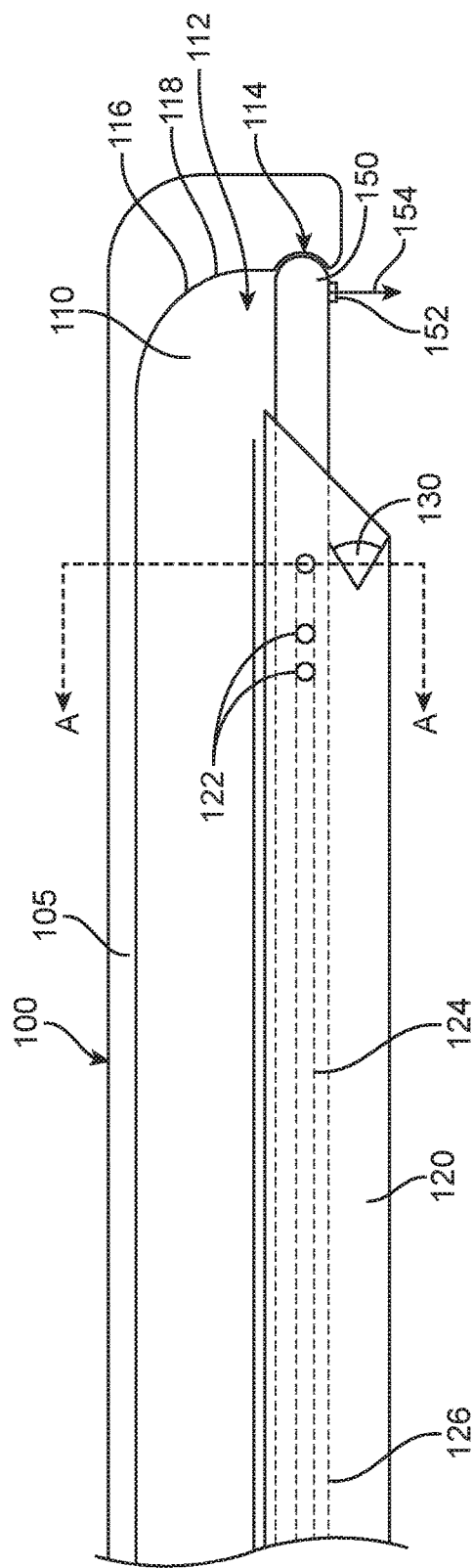

MATERIAL REMOVAL FROM SURGICAL SITE

RELATED APPLICATIONS

This application is a 371 national phase of PCT/US2020/021702, filed Mar. 9, 2020, published as WO 2020/181278 on Sep. 10, 2020, and claims the benefit under 35 U.S.C. § 119 (e) of the filing date of U.S. Provisional Patent Application No. 62/815,328, filed Mar. 7, 2019, entitled MATERIAL REMOVAL FROM SURGICAL SITE, the disclosures of which are incorporated, in their entirety, by this reference.

BACKGROUND

Prior approaches to treating patients and removing material from a surgical site can be less than ideal in some instances. For example, in some surgeries, material such as fluid, resected tissue and cells are removed from the surgical site. However, in some instances the removal of this material can be less than ideal. This can be relevant for surgeries in an enclosed tissue space of an organ such as the prostate. For example, blood clots and other material can potentially clog a drainage system configured to remove tissue from a surgical site. With water jet removal of tissue from a surgical site, water from the water jet can add additional fluid to be removed. Also, it can be helpful to provide fluid to the surgical site to space tissue from a probe. Also, cancer cells can potentially spread to remote tissue with a process known as seeding, and it may be helpful to have improved methods and apparatus to reduce the potential spread of cancer cells from a tumor, for example when a tumor is removed surgically.

In light of the above, it would be helpful to provide improved methods and apparatus for treating tissue and removing material from a surgical site.

SUMMARY

In some embodiments, an energy source supported on a carrier is configured to rotate relative to the carrier to direct energy such as a fluid stream from the energy source toward an opening of an evacuation lumen. This may help to remove material that may collect near the opening, such as blood clots and tissue. The energy source on the energy delivery probe may comprise one or more of a laser energy source, a water jet, an ultrasound energy source, or an electrical energy source such as a radiofrequency (RF) energy source, and directing the energy source toward the evacuation lumen can facilitate removal of material from the evacuation lumen. In some embodiments, directing the fluid stream toward the evacuation lumen can draw flowable material from the surgical site toward the evacuation lumen to improve removal of material from the surgical site.

In some embodiments, a surgical probe comprises a carrier, and an energy source on an energy delivery probe such as a water jet. The energy source on the energy delivery probe may comprise one or more of a laser energy source, a water jet, an ultrasound energy source, or an electrical energy source such as a radiofrequency (RF) energy source. In some embodiments, a structure to deliver energy is located on the energy delivery probe and the structure may comprise one or more of a nozzle, an aperture, an optical fiber, or an electrode. The carrier is configured to translate the energy delivery probe and the structure to deliver energy, such as that a distance between a distal end of the energy delivery probe and the carrier remains substantially fixed. In some embodiments, the energy delivery probe is configured to rotate on the carrier, so as to rotate an angle of the energy delivery structure. In some embodiments, the energy delivery probe comprises a water jet probe and the energy delivery structure comprises a nozzle. In some embodiments, the substantially fixed distance between the end of the energy delivery probe and the carrier can improve the accuracy of energy delivery from the energy delivery probe. In some embodiments, the substantially fixed distance decreases deflection of the energy delivery probe related to transverse forces from a water jet on the energy delivery probe. In some embodiments, an endoscopic camera comprising a lens is located on the carrier and translates with the carrier and the energy delivery probe. In some embodiments, the angular orientation of the carrier and the endoscopic camera remains substantially fixed while the energy delivery probe rotates the energy delivery structure such as the nozzle.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 1A shows a surgical probe comprising a plurality of lumens and a carrier configured to slide along the probe, with the carrier in a first location proximal to an opening to an evacuation lumen, in accordance with some embodiments.

FIG. 1B shows a surgical probe comprising a plurality of lumens and a carrier configured to slide along the probe as in FIG. 1A, with the carrier in a second position near the evacuation lumen, in accordance with some embodiments;

DETAILED DESCRIPTION

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

While some embodiments of the present disclosure are specifically directed to treatment of the prostate, certain aspects of the disclosure may also be used to treat and modify other organs such as brain, heart, lungs, intestines, eyes, skin, kidney, liver, pancreas, stomach, uterus, ovaries, testicles, bladder, ear, nose, mouth, soft tissues such as bone marrow, adipose tissue, muscle, glandular and mucosal tissue, spinal and nerve tissue, cartilage, hard biological tissues such as teeth, bone, as well as body lumens and passages such as the sinuses, ureter, colon, esophagus, lung passages, blood vessels, and throat. The devices disclosed herein may be inserted through an existing body lumen, or inserted through an opening created in body tissue.

The presently disclosed methods and apparatus are well suited for incorporation with prior surgical probes as described in the following: PCT/US2011/023781, filed Feb. 4, 2011, entitled "MULTI FLUID TISSUE RESECTION METHODS AND DEVICES"; PCT/US2013/028441, filed Feb. 28, 2013, entitled "AUTOMATED IMAGE-GUIDED TISSUE RESECTION AND TREATMENT"; PCT/US2014/032879, filed Apr. 2, 2014, entitled "WATER ENUCLEATION OF THE PROSTATE"; PCT/US2014/054412, filed Sep. 5, 2018, entitled "AUTOMATED IMAGE-GUIDED TISSUE RESECTION AND TREATMENT"; PCT/US2015/037521, filed Jun. 24, 2014 entitled "TISSUE SAMPLING AND CANCER TREATMENT METHODS AND APPARATUS"; PCT/US2015/048687, filed Sep. 4, 2015, entitled "GENE ANALYSIS AND GENERATION OF STEM CELL METHODS AND APPARATUS"; PCT/US2015/038605, filed Jun. 30, 2015, entitled "FLUID JET TISSUE RESECTION AND COLD COAGULATION (AQUABLATION) METHODS AND APPARATUS"; the entire disclosures of which are incorporated herein by reference.

Figure 2:
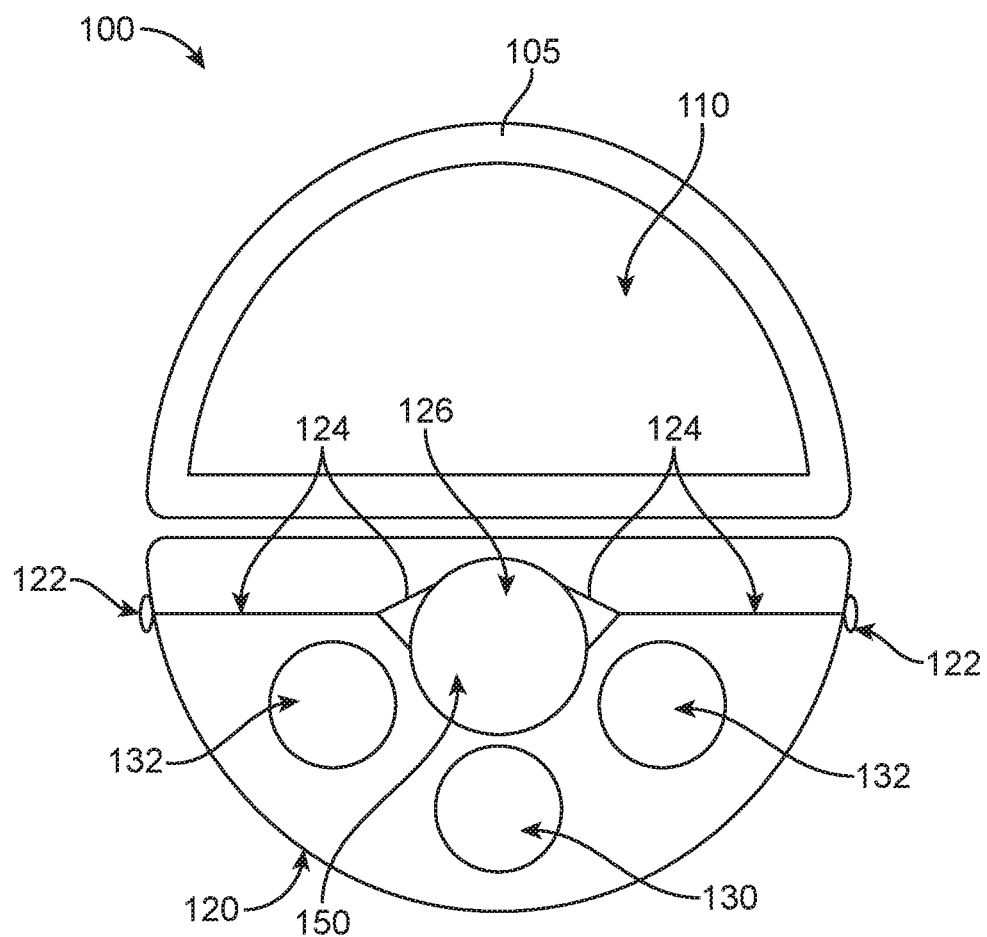
FIG. 2 shows a cross-section of the surgical probe as in FIG. 1B taken along the parting line A-A.

FIG. 1A shows a surgical probe 100 comprising a plurality of lumens and a carrier 120 configured to slide along the probe 100, with the carrier 120 in a first location proximal to an opening 112 to an evacuation lumen 110. FIG. 1B shows the surgical probe 100 comprising a plurality of lumens and a carrier 120 configured to slide along the probe 100 as in FIG. 1A, with the carrier 120 in a second position near the opening 112 to the evacuation lumen 110. FIG. 2 shows a cross-section of the surgical probe as in FIGS. 1A and 1B.

The probe 100 may comprise a component of an apparatus 500 to resect tissue at a surgical site of a patient as described herein. The surgical site of the patient may comprise a surgical site of a naturally occurring lumen of the patient, such as a urethra of the patient, or a surgically created site.

The apparatus 500 may comprise a surgical probe 100 configured for insertion into the patient and an elongate carrier 120 comprising an energy delivery probe 150 having a nozzle 152 configured to emit a fluid stream 154. The energy delivery probe 150 can be configured to delivery any suitable type of energy as described herein, such as one or more of water jet energy, mechanical energy, laser energy, electrical energy or ultrasound energy. Although reference is made to the nozzle 152, the nozzle 152 comprises an exemplary energy delivery structure in accordance with some embodiments. In the context of the present disclosure, reference to the nozzle 152 shall be understood to refer to any suitable energy delivery structure, which may comprise one or more of a nozzle, an aperture, a lens, an optical fiber, an electrode, or an ultrasound array, for example. Although reference is made to the fluid stream 154 released from the energy delivery structure such as nozzle 152, reference to the fluid stream 154 shall be understood to refer to any suitable type of energy for treating tissue, such as one or more of water jet energy, mechanical energy, laser energy, electrical energy or ultrasound energy.

The surgical probe 100 may comprise a plurality of channels, including channels 124 on the carrier 120 and the evacuation lumen 110. For example, the surgical probe 100 may comprise a channel sized to receive the carrier, and an evacuation lumen 110 to remove material from the surgical site. The evacuation lumen 110 may extend to an opening 112 sized and shaped to remove tissue. The carrier 120 can be configured to rotate the energy delivery structure (e.g. nozzle 152) of the energy delivery probe 150 toward the opening 112 of the evacuation lumen to direct the energy such as fluid stream 154 toward the opening of the evacuation lumen in order to draw material such as resected tissue toward the evacuation lumen. Alternatively or in combination, the energy delivery probe 150 can rotate the energy delivery structure (e.g. nozzle 152) with rotational movement 158 and translate the energy delivery structure with translational movement 156 independently of the carrier 120 on which the endoscope camera 130 and illumination sources 132 are mounted. The nozzle 110 can also help to remove material that could block the removal of material, such as clots and pieces of resected tissue that could accumulate near the nozzle, for example by orienting the nozzle toward the evacuation lumen as described herein.

The energy delivery probe 150 may comprise sufficient stiffness to limit deflection of the probe when the jet probe releases a liquid jet into a liquid medium.

In some embodiments the carrier 120 supports the energy delivery probe 150 and a component of an endoscope such as a lens of an endoscope. In some embodiments, the endoscope comprises an endoscopic camera comprising a lens and a camera sensor 130 located on the carrier 120 near a distal end of the carrier 120. Although reference is made to a camera sensor near the distal end of the carrier 120, any suitable endoscope may be used such as a rigid cystoscope or a flexible cystoscope. In some embodiments, the jet probe comprises the nozzle 152. The carrier can be configured to translate the jet probe and the camera together, such that a distance between the nozzle and the camera remains substantially fixed when the carrier translates the jet probe and the camera. In some embodiments, the jet probe is configured to rotate in relation to the carrier in order to direct the nozzle at an angle toward a target tissue. In some embodiments, the carrier comprises stiffness to resist deflection of the jet probe, and a distance between an end of the jet probe and an end of the carrier remains substantially fixed. This approach can decrease whipping like motion of the jet probe, which can be related to the jet emitted transversely from the probe so as to generate lateral forces. In some embodiments, a distal end of the jet probe protrudes beyond a distal end of the carrier by a distance and the distance remains substantially fixed when the carrier translates and the jet probe rotates.

In some embodiments, the surgical probe 100 comprises an elongate shaft 105, in which the elongate shaft 105 defines the evacuation lumen 110 and opening 112. The elongate shaft may comprise an end portion with a recess 114 sized and shaped to receive the distal end of the energy delivery probe 150. When the energy delivery probe 150 has been advanced to contact the recess 114 with the distal end of the energy delivery probe 150, the recess 114 can help to stabilize the energy delivery probe 150, which can be subjected to transverse forces related to the energy released from the probe 150 such as water jet related forces.

The elongate shaft 105 can be sized and shaped in many ways. In some embodiments, the elongate shaft 105 comprises a sheath sized and shaped to receive the carrier 120 and energy delivery probe 150. Alternatively or in combination, the sheath can be sized to receive the elongate shaft 105, the carrier 120 and probe 150. The sheath can be sized to fit within a lumen such as the urethra and receive elongate shaft 105, the carrier 120 and probe 150, for example. The sheath may comprise a distal window or opening. The energy delivery probe 150 and carrier can be sized so that energy delivery probe 150 extends to the window or opening and delivers energy through the window or other opening.

The elongate shaft 105 can be arranged with the carrier 120 to provide desired movement to the carrier 120 and energy delivery probe 150. In some embodiments, the energy delivery probe 150 and endoscope camera comprising sensor 130 are carried on carrier 120 and translate with carrier 120 with translational movement 156. With this configuration, the endoscope and corresponding camera advance and retract with the energy delivery structure (e.g. nozzle 152). In some embodiments, the energy delivery probe 150 is configured to rotate independently of carrier 150 so as to rotate the energy delivery structure (e.g. nozzle 152), while allowing the energy delivery structure and endoscope camera sensor to translate together on carrier 120 in relation to elongate shaft 105.

The energy delivery probe 150 on the carrier 120 can be configured in many ways and may comprise additional energy sources in combination with the fluid stream, such as optical energy or radiofrequency energy, for example. Alternatively, an energy source other than the nozzle 152 can be located on energy delivery probe 150 so as to provide movement of the energy source as described herein.

In some embodiments, carrier 120 comprises an energy delivery probe 150 having a nozzle configured to emit a high-pressure fluid stream 154 comprising a jet. The opening 112 to the evacuation lumen 110 may comprise a cross-sectional area sized larger than the jet. In some embodiments, the jet comprises visible cavitations and the opening is sized larger than a cross-sectional size of the visible cavitations entering the opening of the evacuation lumen.

The surgical probe 100 can be coupled to a source of fluid to release liquid near the nozzle and immerse the nozzle in the liquid from the source. In some embodiments, the carrier 120 comprises irrigation channels 124 extending to openings 122 to release the liquid near the nozzle. The cavitations may comprise cavitations generated with interaction of the fluid from the source and the nozzle 152.

In some embodiments, the nozzle 152 is configured to release a fluid stream comprising one or more of a toxic or chemical agent to necrotize tissue, and the fluid comprises a liquid and the nozzle comprises a high-pressure nozzle to ablate tissue in combination with a necrotizing agent of the liquid.

Referring again to FIGS. 1A and 1B, which illustrate the nozzle pointing away from the aspiration lumen and toward a treatment site. The nozzle can be positioned and oriented by an operator, which may be a human operator, and artificial intelligent operator, a robotic operator, a combination of operators, or some other type of suitable operator. The nozzle can be translated along its longitudinal axis for precise positioning and the carrier comprising the nozzle can be rotated to a high degree of aiming accuracy to the target tissue. The nozzle may be swept, translated, rotated, oscillated, or otherwise moved while a fluid jet is expelled from the nozzle to ablate the target tissue.

Referring again to FIG. 2, a plurality of channels may be formed in the surgical probe 100. One or more channels may be used to provide illumination through the probe 100 with illumination sources 132. One or more channels may be used for imaging, for example with imaging sensor 130. One or more channels may be used for carrier 120 that provides directional energy with the energy delivery structure (e.g. nozzle 152). The plurality of channels may comprise evacuation lumen 110. The evacuation lumen 110 may comprise an aspiration lumen for evacuation of fluid and tissue.

The surgical probe 100 may additionally comprise one or more illumination sources, such as light emitting diodes, for illuminating the treatment site, surrounding tissue, and a pathway leading up to and beyond the treatment site. The illumination sources may be used to enhance the ability of the imaging sensor 130 to capture visual information associated with the treatment site.

Figure 3:
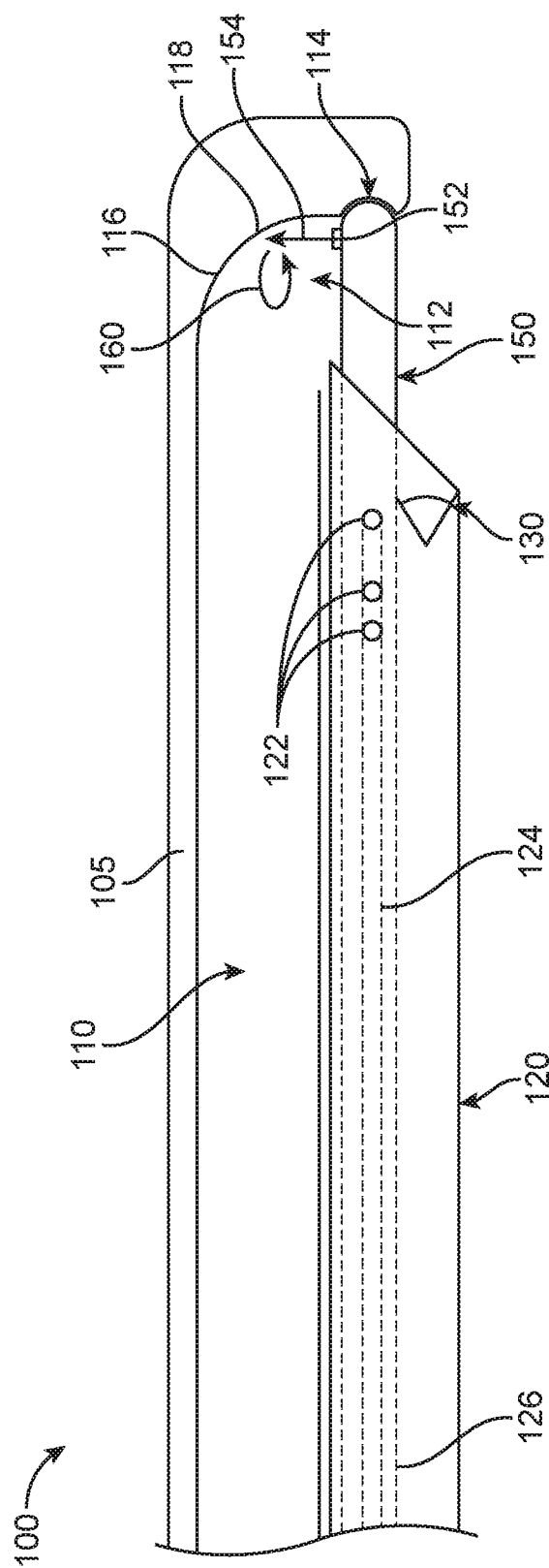
FIG. 3 shows the surgical probe as in FIG. 1B, in which the water jet of carrier has been placed in proximity to the evacuation lumen of the surgical sheath and directed toward the evacuation lumen.

FIG. 3 shows the surgical probe as in FIG. 1B, in which the fluid stream 154 comprising a jet from nozzle 152 locate on carrier 120 has been placed in proximity to the evacuation lumen 110 of the surgical sheath and directed toward the evacuation lumen.

The jet of the fluid stream 154 can be configured to draw fluid and material from the surgical site toward the opening 112 of the evacuation lumen 110 when oriented toward the evacuation lumen 110. This orientation of the nozzle 152 can improve removal of material from the surgical site and may act in combination with suction from the evacuation lumen 110. In some embodiments, the jet generates a pressure gradient, through the venturi effect, to draw the material from the higher-pressure surgical site toward the lower pressure evacuation lumen. Although reference is made to nozzle 152, other energy delivery structures as described herein can be used similarly to nozzle 152, e.g. instead of nozzle 152 or in combination with nozzle 152.

The probe may comprise an outer layer, which defines a portion 118 of the evacuation lumen 110, and acts as a stop configured to block or divert the fluid stream received through the nozzle. In some embodiments, the portion 118 is located along a curved inlet 116 of the evacuation lumen. The elongate shaft 105 may extend to portion 118 so as to define portion 118 with a portion of the shaft 105. The portion 118 is configured to divert the fluid stream and redirect forces from the fluid stream and protect tissue. In some embodiments, the curved inlet 116 is configured to divert the fluid stream from the nozzle in a proximal toward a proximal end of the axial lumen 110, so as to increase evacuation.

As shown in FIG. 3, the energy delivery structure (e.g. nozzle 152) can be oriented so as to point toward the aspiration lumen. In this orientation, the nozzle 152 can expel a fluid jet directly into the aspiration lumen 110, thereby drawing detritus and excess fluid into the aspiration lumen. Further, the fluid stream 154 comprising the fluid jet may be able to clear any blockage that obstructs the aspiration lumen. The jet may be swept, translated, rotated, oscillated, or otherwise moved while the fluid jet is expelled from the nozzle toward the evacuation lumen to assist with evacuation. This sweeping of the jet can increase the rate of fluid flow along the evacuation lumen. Although reference is made to an energy stream comprising a fluid jet, other energy sources as described herein can be used to clear blockages and obstructions in the aspiration lumen.

The aspiration lumen 110 may be configured, such as by having a curved or angled inlet 116, to redirect fluid from the nozzle down the aspiration lumen. In some embodiments, the nozzle 152 may provide a jet stream that is generally transverse (e.g. orthogonal) to the longitudinal axis of the aspiration lumen 110, and the aspiration lumen may be configured to redirect the orthogonal jet stream toward the longitudinal axis of the aspiration lumen 110 without disbursing all of the kinetic energy from the jet stream. The evacuation rate can be influenced by jet velocity, evacuation tube diameter, evacuation tube inlet aperture, distance between the nozzle and the evacuation tube inlet, and where the nozzle is aimed in relation to the evacuation tube inlet aperture.

In some embodiments, the jet released into the evacuation lumen can increase the flow rate of evacuation to be above the flow rate of the nozzle. By directing the nozzle toward the evacuation lumen, the jet can increase the fluid flow by at least a factor of two for example. In some embodiments, the rate of evacuation is at least five times, for example at least ten times the flow rate of the nozzle. The dispersion of the liquid jet into the liquid in the evacuation nozzle can result in an increased flow rate above the flow rate of the nozzle. In some embodiments, moving the jet with a scan 160 increases the flow rate of the evacuation lumen. The scan pattern of the energy such as fluid stream 154 comprising the jet may comprise any suitable scan pattern, such as one or more of a line scan, a raster scan, a circular scan, or a spiral scan. In some embodiments, the scanning of the fluid stream 154 increases the cross-sectional area of the evacuation lumen exposed to the fluid stream so as to increase the rate of evacuation. The scan can be implemented with one or more of a translation movement 156 or rotational movement 158 of the nozzle 152 on the energy delivery probe 150.

Figure 4:
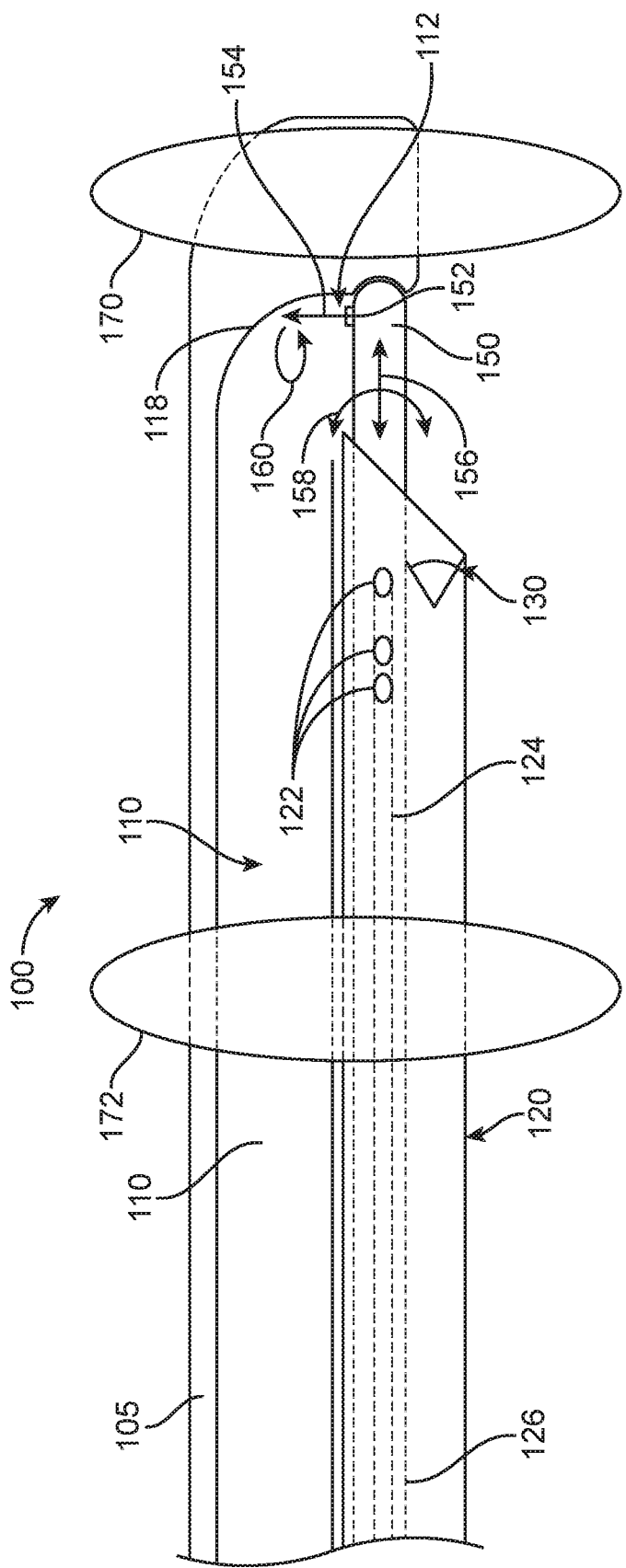
FIG. 4 shows a surgical probe having expandable supports to stabilize the probe and/or inhibit fluid flow distal and proximal to the treatment site, in accordance with some embodiments.

FIG. 4 shows a surgical probe 100 in which two expandable supports 170, 172, are configured to isolate the surgical site. In some embodiments, one or more expandable supports 170, such as occlusion balloons, can be carried by the surgical probe 100 and selectively expanded to steady the apparatus within the treatment lumen, inhibit free fluid flow, and/or provide a treatment chamber. For instance, one or more expandable supports 170 such as one or more occlusion balloons can be inflated distal to the treatment site to inhibit fluid flow. Alternatively or in combination, a second expandable support 172 such as a second occlusion balloon may be inflated proximal to the treatment site. The balloons can thus be used to stabilize the apparatus within the lumen to allow for precise positioning of the energy source such as the nozzle 152. In addition, the expandable supports can also form a treatment chamber in which working fluid from the nozzle is largely contained to aid in evacuation of the fluid and tissue. For example, a first expandable support 170 can be placed and expanded distal to the treatment site, and a second expandable support 172 can be placed and expanded proximal to the treatment site, with the nozzle 152 and opening 112 to evacuation lumen 110 located near the treatment site and between the two expandable supports, e.g. balloons. The openings 122 coupled to the one or more irrigation channels 124 can be located between the first expandable support 170 and the second expandable support 172. In this way, fluid used in the treatment and resected tissue may be largely contained and evacuated.

The surgical probe 100 can be placed in the lumen, and the expandable supports 170, 172, configured to engage the walls of the lumen to decrease fluid flow away from the surgical site. The probe 100 may comprise a first expandable support 170 configured to expand in the lumen of the patient at a location distal to the nozzle to inhibit fluid flow from the fluid stream distal to the support along the lumen and a second expandable support 172 proximal to the nozzle configured to inhibit fluid flow from the fluid stream proximal to the second support. While the expandable supports can be configured in many ways, in some embodiments the first expandable support comprises a first balloon and the second expandable support comprises a second balloon. Alternatively or in combination, the expandable supports may comprise structures, such as stents, clips, shape memory materials, membranes or other structures to decrease the flow of fluid in the lumen when the support comprises an expanded configuration.

The carrier 120 can optionally be configured to rotate, translate and/or oscillate relative to the probe 100 with the expandable supports engaging the wall of the lumen. For instance, a motor can be operatively coupled to the energy delivery probe 150 and/or the carrier 120 to oscillate the energy delivery structure (e.g. nozzle 152) to promote more efficient tissue ablation. More specifically, one or more actuators, such as motors, can be coupled to a linkage coupled to the carrier to move the carrier 120 and the energy delivery probe 150 in a direction along their longitudinal axes with translational movement 156.

The linkage can be configured to rotate the energy delivery probe 150 about its longitudinal axis with rotational movement 158 to orient the nozzle to more efficiently ablate or evacuate tissue. In some embodiments, motors are used to translate and rotate the carrier according to a treatment plan.

Figure 5:
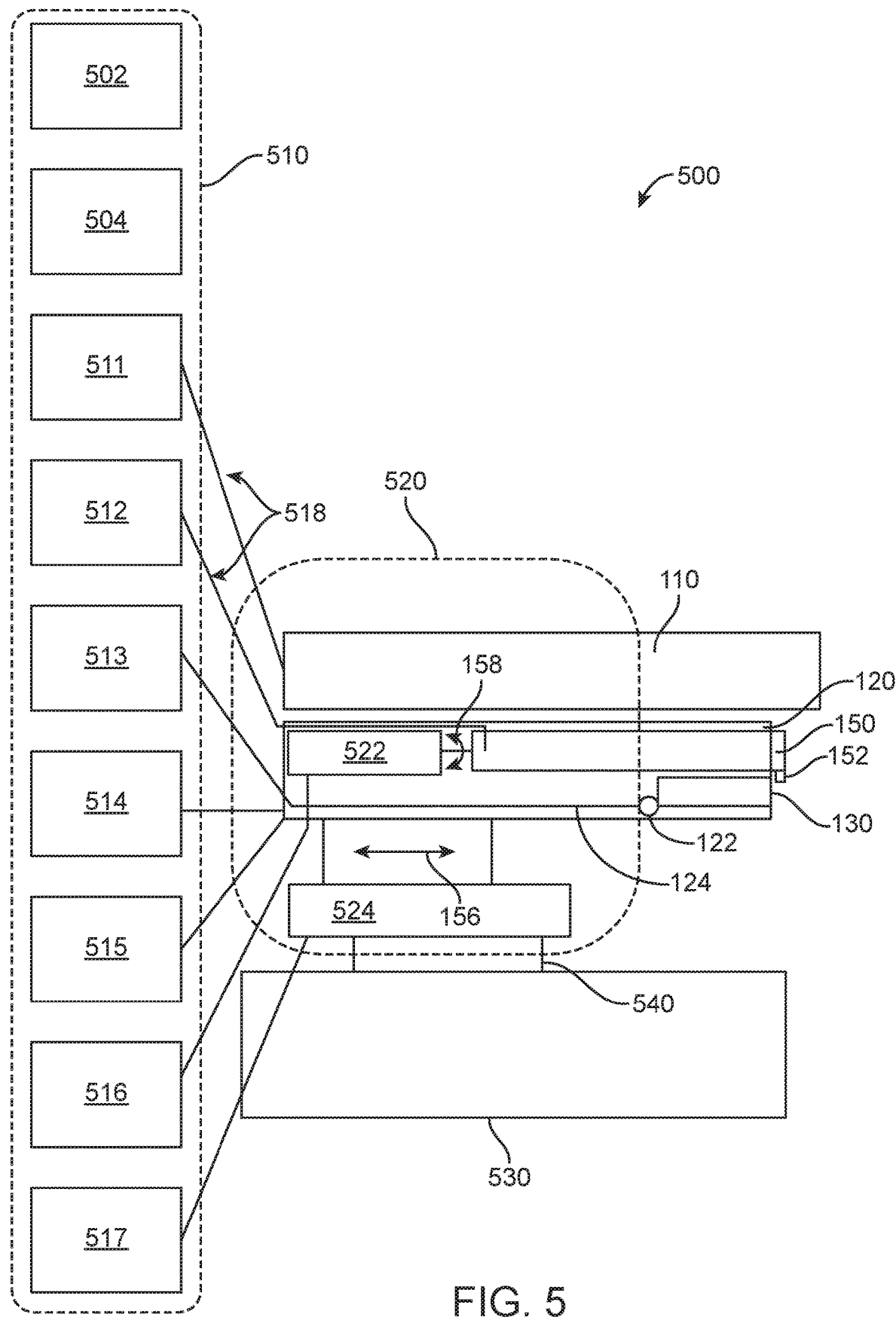
FIG. 5 shows an apparatus to treat a patient, in accordance with some embodiments.

FIG. 5 shows an apparatus 500 to treat a patient. In some embodiments, the apparatus 500 comprises a console 510, a handpiece 520 and an arm 530.

The console 510 comprises one or more of processors, circuitry or controls to connect to the surgical probe and operate the surgical probe as described herein. The console 510 comprises a display 502, such as a touch screen display to receive user inputs and to display images from the probe. The console 510 comprises a processor 504 operatively coupled to the components of the console in order to control the components of the console. The console 510 may comprise one or more pumps to control fluid at the surgical site, such as one or more of an evacuation pump or an irrigation pump. In some embodiments, the console 510 comprises an evacuation pump 511 configured to evacuate material from the surgical site with the evacuation lumen. In some embodiments, the evacuation pump 511 comprises a metering pump to control an evacuation rate from the lumen 110. In some embodiments, the metering pump is configured to move a volume of liquid in a specified time. In some embodiments, the evacuation pump comprises a peristaltic pump.

In some embodiments, an irrigation source 513 is configured to couple to the irrigation lumen and openings as described herein. In some embodiments, the irrigation source comprises a bag of saline or other suitable reservoir placed at a suitable height above the surgical probe 100 to provide pressurized fluid flow. Alternatively or in combination, a pump can be used to pump an irrigation fluid such as saline to the surgical site. In some embodiments, an irrigation pump to control an irrigation rate into the surgical site. The irrigation pump may comprise a metering pump to move a volume of liquid in a specified time. In some embodiments, the irrigation pump comprises a peristaltic pump.

In some embodiments, the console comprises circuitry coupled to a pressure sensor to measure fluid pressure between the evacuation pump and the irrigation pump. The pressure sensor can be located at any suitable location, such as near the opening to the evacuation lumen, or along the channel to the one or more irrigation openings. In some embodiments the fluid sensor is located on one or more of the carrier, the surgical probe, or the energy deliver probe, at a location that is upstream from the water jet nozzle.

The console 510 may comprise an energy source 512, such as a pump to generate high pressure fluid for a water jet, although a different energy source can be used as described herein. An illumination source 514, such as an illumination intensity control, is configured couple to the illumination source on the surgical probe to adjust the intensity of illumination at the surgical site. An image sensor control 515 can be configured to control the image sensor on the probe, and to display the images from the image sensor on the display 502. An independent rotation module 516 is configured to control rotation of the energy delivery probe 150 inside the carrier independently of the translation of the carrier and energy delivery probe 150. An independent translation module 517 is configured to control the translational movement 156 of the carrier 120, energy delivery probe 150, and camera sensor 130, independently of the rotation of the energy delivery probe 150.

In some embodiments, the console 510 is connected to handpiece 520 comprising the surgical probe 100 with a plurality of lines 518, which may comprise high pressure tubing and electrical control lines, for example. In some embodiments, the handpiece 520 is coupled to an arm 530 with a coupling 540. The arm 530 may comprise a robotic arm or other arm suitable for supporting the handpiece during surgery. In some embodiments, the handpiece is configured to decouple from the arm to allow the user such as a surgeon to move the handpiece when grasped with a hand of the user.

The handpiece 520 may comprise several components of the surgical probe 100. In some embodiments, the handpiece comprises the evacuation lumen 110, the carrier 120, the endoscope 130 and the energy delivery probe 150. In some embodiments, the handpiece comprises a translation linkage 524 is coupled to the processor and configured to translate the carrier 120, the energy delivery probe 150, and the endoscope 130. The irrigation lumen 124 and irrigation openings 122 can translate with the carrier, so as to translate with energy delivery probe 150 and endoscope 130. A rotation linkage 522 is coupled to the processor and configured to rotate the energy delivery probe 150. In some embodiments, the rotation linkage 522 is configured to rotate the energy delivery probe 150 without rotating the carrier 120 and endoscope camera sensor 130.

The surgical apparatus 500 may comprise an arm 530 coupled to the surgical probe 100 comprising the carrier 120, the evacuation lumen 110, the opening 112 to the evacuation lumen 110 and energy delivery probe 150. The surgical probe 100 can be configured to decouple from the arm 530 to allow a surgeon to grasp a proximal end of the surgical probe and move the surgical probe 100 within the patient with hand motion when the nozzle is oriented toward the opening to the evacuation lumen. The probe decoupled from the arm may comprises circuitry to rotate, translate and oscillate the jet probe relative to the opening, for example.

In some embodiments, the apparatus 500 may comprises processor 504 coupled to the carrier 120. The processor can be configured with instructions to move the carrier 120 and/or energy delivery probe 150 in accordance with a treatment plan. The processor can be configured with instructions to rotate the nozzle toward the opening of the evacuation lumen. In some embodiments, the processor 504 is configured with instructions to scan the jet in accordance with the treatment plan, which may comprise a plurality of scans of the jet to resect the tissue in accordance with the treatment plan. The treatment plan may comprise a plurality of scans, and the processor 504 configured with instructions to direct the jet toward the opening of the evacuation lumen to clear the lumen of debris between the plurality of scans.

The treatment plan may further include one or more scans 160 of the jet toward the opening 112 of the evacuation lumen 110, so as to dislodge obstructions and/or promote material to be evacuated. In some instances, resected material may become lodged in the opening or within the evacuation lumen. The nozzle may be directed toward the opening of the evacuation lumen and the nozzle operated to dislodge or otherwise divide the resected material into smaller fragments to promote evacuation.

The probe 100 and evacuation lumen 110 can be coupled to circuitry, pumps and sensors to manage the amount of fluid at the surgical site, or other site within the patient, for example with console 510. As material is evacuated from the treatment site, it can be helpful to manage the amount of fluid at the surgical site. In some embodiments, fluid evacuation may be controlled, such as by increasing or decreasing the volume of fluid being evacuated. In some embodiments, additional fluid may be provided to the treatment site to compensate for the volume of evacuated fluid. For instance, a pump, such as a peristaltic pump, may be used to meter the fluid level at the treatment site or within areas near the treatment site. Controlling the volumes of fluid injection and aspiration may aid in allowing better visibility, controlling distension, providing improved tissue evacuation and working fluid removal.

The energy delivery structure (e.g. nozzle 152) on the energy delivery probe 150 supported with the carrier 120 can be coupled to a linkage to move the energy delivery structure, such as the rotation linkage 522 and the translation linkage 524. The linkage can be coupled to a processor 504 configured with instructions to move the energy delivery structure to provide energy such as fluid stream 154 toward the evacuation opening with movement of the energy delivery structure (e.g. nozzle 152) relative to the opening. In some embodiments, the movement corresponds to an area of scanning of the nozzle around an area of the opening, such as scan 160. For example, the probe may can be moved translationally and rotationally with the linkage to scan the jet toward the evacuation lumen. In some embodiments, the processor, linkage and nozzle are configured to sweep the water jet in an oscillating scan path toward the opening of the lumen to increase fluid flow toward the opening. The oscillating scan path may correspond to a perimeter of the opening 112, for example.

While the carrier 120 and energy delivery probe 150 can be configured in many ways, in some embodiments the energy delivery probe 150 is configured to move at least rotationally independently of the carrier 120 on which the illumination and camera are mounted. This can allow the energy delivery probe 150 to be directed toward the evacuation lumen 110 while the camera and illumination are directed toward a surgical site. This can allow a user to move the probe and direct the surgical probe 100 to tissue of interest while the energy delivery probe 150 provides increased evacuation. In some embodiments, the energy delivery probe 150 is configured to move rotationally and translationally relative to the carrier on which the illumination and camera are mounted.

Figure 6:
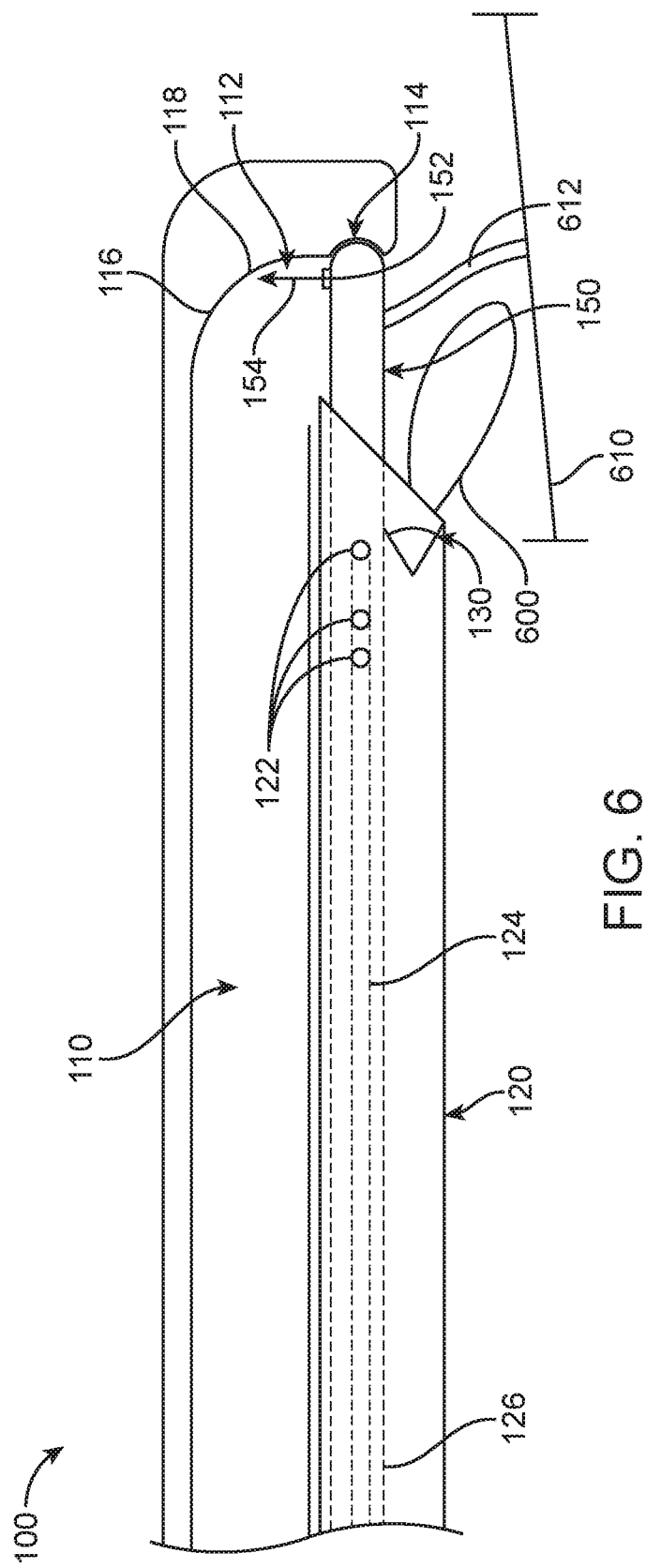
FIG. 6 shows a surgical treatment probe comprising an electrode, in accordance with some embodiments.

FIG. 6 shows a surgical treatment probe 100 comprising an electrode 600. At least a portion of the electrode 600 extends within the field of view of the image sensor 130, so as to allow visualization of the electrode contacting tissue. The electrode 600 may comprise any suitable electrode such as an RF electrode, or a cautery electrode, for example. The surgical treatment probe 100 can be configured to direct the energy such as fluid stream 154 into the evacuation lumen, so as to promote fluid flow from the surgical site. In some embodiments, fluid stream 154 comprises a cavitating water jet directed into the evacuation lumen.

The apparatus 500 may comprise an endoscopic imaging sensor 130, such as a CMOS imaging sensor, for example. The imaging sensor 130 may be used to position one or more of the probe 100, the energy delivery probe 150, to position the energy delivery structure (e.g. nozzle 152), to position the carrier 120, to determine a treatment plan, to visually check target tissue resection, for evacuation, or to allow efficiency of treatment site cleanup, among other things. In some embodiments, the imaging sensor 130 comprises a color imaging sensor, and active bleeding near the treatment site can be visually identified, located, and cauterized such as by RF cauterization. In some embodiments, a bleeding site releases blood which appears as a plume 612, which can be visualized with the endoscope and cauterized. In some embodiments, the energy delivery structure (e.g. nozzle 152) is directed toward the opening 112 of evacuation lumen 110 while energy such as fluid stream 154 is released from the energy delivery structure.

While the endoscope of the probe can be configured in many ways, in some embodiments and endoscopic camera comprising sensor 130 is located near a distal end of the movable carrier 120 to image the surgical site. The endoscope camera can be configured to view the distal portion of the jet probe and a surgical site spaced apart from the nozzle of the jet probe, for example.

The apparatus 500 may comprise electrode 600 for cauterizing tissue. The electrode 600 can be located on the carrier 120 or the jet probe 100 to cauterize tissue, for example when the jet nozzle is oriented toward the opening to the lumen. In some embodiments, the electrode comprises a cautery electrode located near a distal end of the jet probe, and the carrier comprises the endoscope, illumination and a return path of the electrode. Alternatively or in combination, the material defining the lumen and opening may comprise the return path of the electrode. In some embodiments, the carrier 120 comprises the electrode 600, and the electrode is located near a distal end of the carrier 120. The energy delivery probe 150 may comprise the electrode, the carrier 120 may comprise a return path for the electrode 600 on the energy delivery probe 150, for example. In some embodiments, the energy delivery probe 150 comprises the electrode 600, and the material defining the evacuation lumen 110 comprise a return path for the electrode 600 on the energy delivery probe 150, for example. In some embodiments, the energy delivery probe 150 rotates independently of the endoscopic camera comprising sensor 130, and the endoscopic camera remains oriented toward an exterior of the carrier 120 when the energy delivery structure (e.g. nozzle 152) is oriented toward the opening 112 of the lumen. The endoscopic camera on the carrier 120 can remain oriented to view blood from a bleeding blood vessel, e.g. plume 612, when the nozzle on the energy delivery probe 150 has been oriented toward the opening 112 to the evacuation lumen 110. The blood from the vessel may appear as a plume 612 drawn toward the opening 112 to the evacuation lumen 110, and the user can direct the electrode toward the source of bleeding and visualize the plume and the electrode contacting the bleeding tissue.

Figure 7:
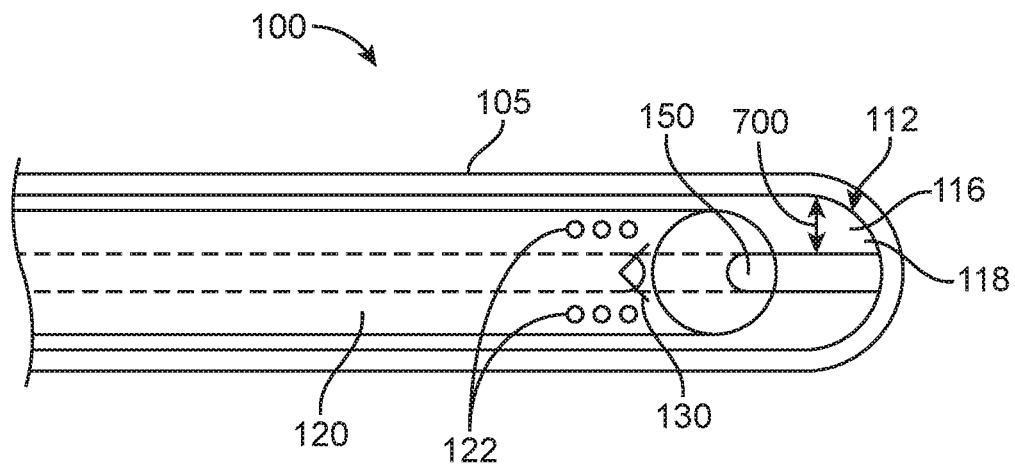
FIG. 7 shows a probe with an opening to the evacuation lumen dimensioned to provide a gap, in which the gap is dimensioned to inhibit intact issue from entering the opening, in accordance with some embodiments.

FIG. 7 shows a probe 100 with an opening 112 to the evacuation lumen 110 dimensioned to provide a gap 700, in which the gap 700 is dimensioned to inhibit intact issue from entering the opening. The probe 100 may comprise the opening 112 along the channel of the evacuation lumen 110 in which the carrier is located, so as to expose the carrier in order to release the fluid stream from the nozzle toward tissue to be treated. In some embodiments, the channel and opening are dimensioned to provide the gap 700 between the carrier and the probe, and the gap is dimensioned to inhibit intact tissue from entering a space between the energy delivery structure (e.g. nozzle 152) and the opening of the evacuation lumen 112. The gap can be sized appropriately, for example within a range from about 0.25 mm to about 5 mm, so as to inhibit intact tissue from entering the opening. Some tissue, such as pathologic tissue can be drawn into to opening and resected with the jet, for example.

Figure 8:
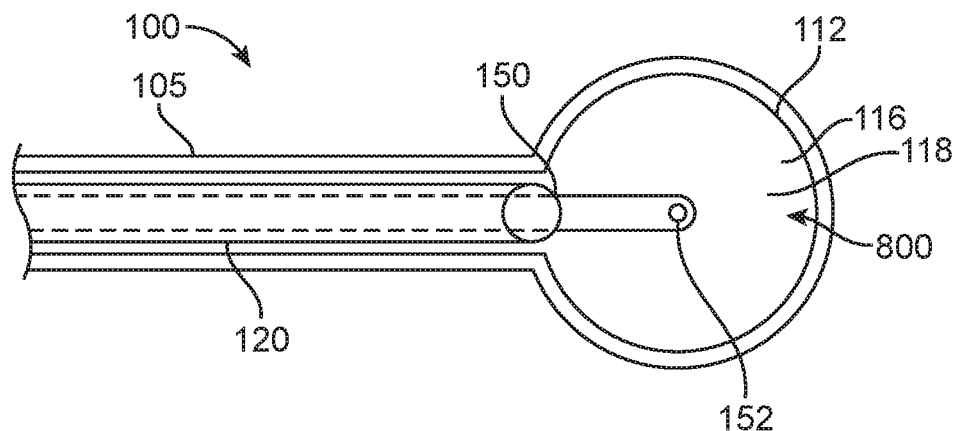
FIG. 8 shows a probe comprising a scoop, in accordance with some embodiments.

FIG. 8 shows a probe 100 comprising a scoop 800. In some embodiments the scoop 800 is coupled to the probe 100, in which the scoop comprises a cross-section area sized larger than the evacuation lumen and the scoop is coupled to an evacuation source. The scoop can be configured to rotate with the jet or remain stationary while the jet moves.

The present disclosure includes the following numbered clauses.

Clause 1. An apparatus to treat tissue at a surgical site of a patient, the apparatus comprising: an elongate carrier comprising a nozzle configured to emit a fluid stream; and a probe configured for insertion into a patient, the probe comprising an evacuation lumen to remove material from the surgical site, the evacuation lumen extending to an opening; wherein the carrier is configured to rotate the nozzle toward the opening to direct the fluid stream toward the opening of the evacuation lumen.

Clause 2. The apparatus of clause 1, wherein an evacuation rate of material through the evacuation lumen is at least twice a flow rate of liquid through the nozzle.

Clause 3. The apparatus of clause 1, wherein the carrier is configured to rotate the nozzle away from the opening to the evacuation lumen to resect tissue.

Clause 4. The apparatus of clause 3, wherein the carrier supports an energy delivery probe and an endoscopic camera comprising a sensor array, the energy delivery probe comprising the nozzle.

Clause 5. The apparatus of clause 4, wherein the carrier is configured to translate the energy delivery probe and the camera together and optionally wherein a distance between the nozzle and the camera remains substantially fixed when the carrier translates the energy delivery probe and the camera.

Clause 6. The apparatus of clause 5, wherein the energy delivery probe is configured to rotate in relation to the carrier in order to direct the nozzle at an angle toward a target tissue.

Clause 7. The apparatus of clause 6, wherein the carrier comprises stiffness to resist deflection of the energy delivery probe and wherein a distance between an end of the energy delivery probe and an end of the carrier remains substantially fixed.

Clause 8. The apparatus of clause 7, wherein a distal end of the energy delivery probe protrudes beyond a distal end of the carrier by a distance and wherein the distance remains substantially fixed when the carrier translates and the energy delivery probe rotates.

Clause 9. The apparatus of clause 8, wherein the carrier comprises one or more irrigation channels extending to one or more openings and optionally wherein the one or more openings is located proximal to the camera.

Clause 10. The apparatus of clause 1, wherein the fluid stream comprises a jet, and wherein the opening comprises a cross-sectional area sized larger than the jet and optionally wherein the jet comprises visible cavitations and the opening is sized larger than a cross-sectional size of the cavitations of the jet entering the opening.

Clause 11. The apparatus of clause 10, wherein the probe is coupled to a source of fluid to release liquid near the nozzle to immerse the nozzle in the liquid, and wherein the cavitations comprise cavitations generated with interaction of the fluid and the nozzle.

Clause 12. The apparatus of clause 10, wherein the jet is configured to draw fluid and material from the surgical site toward the opening of the evacuation lumen when oriented toward the evacuation lumen and optionally wherein the jet generates a venturi effect to draw the material from the surgical site toward the evacuation lumen.

Clause 13. The apparatus of clause 1, wherein evacuation lumen of the probe comprises a diverter configured to divert the fluid stream received from the nozzle toward an elongate axis of the evacuation lumen.

Clause 14. The apparatus of clause 1, wherein the probe is configured to release the fluid stream from the nozzle toward tissue, and wherein an opening to the evacuation lumen is dimensioned to provide a gap between the carrier and the probe, and optionally wherein the gap is dimensioned to inhibit intact tissue from entering a space between the nozzle and the opening of the evacuation lumen.

Clause 15. The apparatus of clause 1, further comprising a first expandable support coupled to the probe and configured to expand in a lumen of the patient at a location distal to the nozzle to inhibit fluid flow from the fluid stream distal to the support along the lumen and a second expandable support proximal to the nozzle configured to inhibit fluid flow from the stream proximal to the second support and optionally wherein the first expandable support comprises a first balloon and the second expandable support comprises a second balloon.

Clause 16. The apparatus of clause 1, further comprising a processor coupled to the carrier to rotate the nozzle toward the opening of the evacuation lumen and optionally wherein the processor is configured to scan the jet in accordance with the treatment plan comprising a plurality of scans of the jet, and wherein the processor is configured with instructions and to direct the jet toward the opening of the evacuation lumen between the plurality of scans.

Clause 17. The apparatus of clause 1, further comprising a scoop coupled to the probe, the scoop comprising a cross-section area sized larger than the evacuation lumen.

Clause 18. The apparatus of clause 1, wherein the nozzle is configured to release a fluid comprising one or more of a toxic or chemical agent to necrotize tissue and optionally wherein the fluid comprises a liquid and the nozzle comprises a high-pressure nozzle to ablate tissue in combination with a necrotizing agent of the liquid.

Clause 19. The apparatus of clause 1, further comprising an irrigation channel configured to release a fluid comprising one or more of a toxic or chemical agent to necrotize tissue and optionally wherein the fluid comprises a liquid and optionally wherein the irrigation channel comprises a channel within the carrier within which an energy delivery probe rotates, translates or oscillates and optionally wherein the channel comprises a channel within which the carrier rotates, translates or oscillates and optionally wherein the energy delivery probe is configured to move within the carrier with translational motion and optionally wherein the carrier is configured to move within a channel of the surgical probe with the translational motion.

Clause 20. The apparatus of clause 1, wherein the irrigation channel is configured to release a fluid comprising one or more of a toxic or chemical agent to necrotize tissue and optionally wherein the fluid comprises a liquid Clause 21. The apparatus of clause 1, wherein carrier comprises an energy delivery probe configured to rotate independently of the carrier.

Clause 22. The apparatus of clause 1, wherein the nozzle is located on an energy delivery probe supported with the carrier and coupled to a linkage to move the nozzle, the linkage coupled to a processor, and wherein the processor is configured with instructions to move the nozzle to provide a fluid stream toward the opening with movement of the nozzle relative to the opening and optionally wherein the movement corresponds to an area of scanning of the nozzle around an area of the opening and optionally wherein the nozzle is configured to sweep the water jet in an oscillating scan path toward the opening of the lumen to increase fluid flow toward the opening and optionally wherein the oscillating scan path corresponds to a perimeter of the opening.

Clause 23. The apparatus of clause 1, further comprising an evacuation pump to control an evacuation rate from the lumen and optionally wherein the pump comprises a metering pump to move a volume of liquid in a specified time.

Clause 24. The apparatus of clause 23, wherein the evacuation pump comprises a peristaltic pump.

Clause 25. The apparatus of clause 23, further comprising an irrigation pump to control an irrigation rate into the surgical site and optionally wherein the irrigation pump comprises a metering pump to move a volume of liquid in a specified time.

Clause 26. The apparatus of clause 25, wherein the irrigation pump comprises a peristaltic pump.

Clause 27. The apparatus of clause 25, further comprising a pressure sensor to measure fluid pressure between the evacuation pump and the irrigation pump.

Clause 28. The apparatus of clause 1, further comprising a metering pump to control a rate of fluid flow into the surgical space at a ratio as compared to a rate of fluid being evacuated from the surgical space and optionally wherein the rate of fluid flow into the space is greater than the evacuation rate from the space and optionally wherein the rate of fluid flow into the space is less than the evacuation rate from the space.

Clause 29. The apparatus of clause 1, further comprising a metering pump to control a fluid flow into the surgical space at a ratio compared to the rate being evacuated that ratio being greater than the evacuation rate or less than the evacuation rate.

Clause 30. The apparatus of clause 1, further comprising an arm coupled to the probe, wherein the probe is configured to decouple from the arm to allow a surgeon to grasp a proximal end of the probe and move the probe within the patient with hand motion when the nozzle is oriented toward the opening and optionally wherein the probe decoupled from the arm comprises circuitry to rotate, translate and oscillate the carrier relative to the opening.

Clause 31. The apparatus of clause 1, further comprising a cautery electrode located near a distal end of the probe and optionally wherein the carrier comprises the electrode, the electrode located near a distal end of the carrier, and optionally wherein the probe comprises a return for the electrode and optionally wherein the electrode is placed on the carrier to cauterize tissue when the nozzle of the carrier is oriented toward the opening to the lumen and optionally wherein the carrier rotates independently of the endoscopic camera and optionally wherein the endoscopic camera remains oriented toward an exterior of the probe when the nozzle is oriented toward the opening of the lumen and wherein the endoscopic camera is configured to view blood from a bleeding blood vessel as a plume drawn toward the opening.

Clause 32. An apparatus to treat tissue at a surgical site of a patient, the apparatus comprising: a lens to view the tissue at the surgical site; an energy delivery probe comprising an energy delivery structure to emit energy toward the tissue; and an elongate carrier to support the energy delivery probe, the elongate carrier configured to rotate the energy delivery probe to direct the energy to treat the tissue; wherein the carrier supports the lens and is configured to translate the energy delivery probe and the lens together.

Clause 33. The apparatus of clause 32, wherein a distance between the energy source and the lens remains substantially fixed when the carrier translates the energy delivery probe and the lens.

Clause 34. The apparatus of clause 32, wherein the lens comprises a lens of an endoscopic camera comprising a sensor array and wherein a distance between the energy source and the lens of the camera remains substantially fixed when the carrier translates the camera and the energy source and optionally wherein a distance between the sensor array and the energy source remains substantially fixed.

Clause 35. The apparatus of clause 32, wherein the energy delivery structure comprises one or more of a nozzle, an aperture, a lens, an optical fiber, an electrode, or an ultrasound array and wherein the energy comprises one or more of water jet energy, mechanical energy, laser energy, electrical energy or ultrasound energy.

Clause 36. The apparatus of clause 32, further comprising a probe configured for insertion into a patient, the probe comprising an evacuation lumen to remove material from the surgical site, the evacuation lumen extending to an opening.

Clause 37. The apparatus of clause 34, wherein the carrier is configured to rotate the energy source toward the evacuation lumen to evacuate tissue and away from the opening of the evacuation lumen to treat tissue.

Clause 38. The apparatus of clause 37, wherein the energy delivery probe is configured to rotate in relation to the carrier in order to direct the energy at a rotational angle toward a target tissue.

Clause 39. The apparatus of clause 38, wherein the carrier comprises stiffness to resist deflection from the energy source.

Clause 40. The apparatus of clause 39, wherein a distal end of the energy delivery probe protrudes beyond a distal end of the carrier by a distance and wherein the distance remains substantially fixed when the carrier translates and the energy delivery probe rotates.

Clause 41. The apparatus of clause 40, wherein the carrier comprises one or more irrigation channels extending to one or more openings and optionally wherein the one or more openings is located proximal to the lens of the endoscope.

Clause 42. The apparatus of clause 32, wherein the energy delivery probe comprises a jet probe, the energy delivery structure comprises a nozzle, and the energy comprises energy from a water jet.

Clause 43. The apparatus of clause 42, wherein the carrier is configured to rotate the nozzle toward an evacuation lumen to remove tissue resection products from the evacuation lumen and toward tissue to resect tissue.

Clause 44. The apparatus of clause 43, wherein the jet probe is configured to rotate in relation to the carrier in order to direct the nozzle at a rotational angle toward a target tissue.

Clause 45. The apparatus of clause 44, wherein the carrier comprises stiffness to resist deflection of the nozzle of the jet probe and wherein a distance between an end of the jet probe and an end of the carrier remains substantially fixed.

Clause 46. The apparatus of clause 45, wherein a distal end of the jet probe protrudes beyond a distal end of the carrier by a distance and wherein the distance remains substantially fixed when the carrier translates and the jet probe rotates.

Clause 47. The apparatus of clause 46, wherein the carrier comprises one or more irrigation channels extending to one or more openings and optionally wherein the one or more openings is located proximal to the lens.

Clause 48. A method, the method comprising treating a patient with the apparatus of any one of the preceding clauses.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An apparatus to treat tissue at a surgical site of a patient, the apparatus comprising:
an elongate carrier comprising a nozzle configured to emit a fluid stream, the elongate carrier comprising a longitudinal axis; and
a probe configured for insertion into a patient, the probe comprising an evacuation lumen to remove material from the surgical site, the evacuation lumen extending to an opening; wherein the fluid stream comprises a jet, and wherein the opening comprises a cross-sectional area sized larger than the jet and wherein the probe extends beyond the elongate carrier to at least partially define the opening and wherein the probe comprises a portion with a recess sized and shaped to receive a distal end of an energy delivery probe extending from the elongate carrier to stabilize the energy delivery probe;
wherein the elongate carrier is configured to rotate the nozzle around the longitudinal axis to a first position toward the opening to direct the fluid stream toward the opening of the evacuation lumen;
wherein the elongate carrier is configured to rotate the nozzle around the longitudinal axis to a second position opposite the first position and away from the opening to the evacuation lumen to treat the tissue.

2. The apparatus of claim 1, wherein an evacuation rate of material through the evacuation lumen is at least twice a flow rate of liquid through the nozzle.

3. The apparatus of claim 1, wherein the elongate carrier comprises the energy delivery probe; wherein the energy delivery probe comprises the nozzle and wherein the elongate carrier supports an endoscopic camera comprising a sensor array.

4. The apparatus of claim 3, wherein the elongate carrier is configured to translate the energy delivery probe and the endoscopic camera together.

5. The apparatus of claim 4, wherein the energy delivery probe is configured to rotate in relation to the elongate carrier in order to direct the nozzle at an angle toward a target tissue.

6. The apparatus of claim 5, wherein the elongate carrier comprises stiffness to resist deflection of the energy delivery probe and wherein a distance between an end of the energy delivery probe and an end of the elongate carrier remains substantially fixed.

7. The apparatus of claim 6, wherein a distal end of the energy delivery probe protrudes beyond a distal end of the elongate carrier by a distance and wherein the distance remains substantially fixed when the elongate carrier translates and the energy delivery probe rotates.

8. The apparatus of claim 7, wherein the elongate carrier comprises one or more irrigation channels extending to one or more openings.

9. An apparatus to treat tissue at a surgical site of a patient, the apparatus comprising:
a lens to view the tissue at the surgical site;
an energy delivery probe comprising an energy source to emit an energy toward the tissue, the energy delivery probe comprising a longitudinal axis; and
an elongate carrier to support the energy delivery probe, the elongate carrier configured to rotate the energy delivery probe to direct the energy to treat the tissue, the elongate carrier comprising an evacuation lumen extending to an opening to remove material from the surgical site; a probe configured to be inserted into the patient, the probe comprising an evacuation lumen to remove material from the surgical site, the evacuation lumen extending to the opening and wherein the probe extends beyond the energy delivery probe and at least partially defines the opening and wherein the probe comprises a portion with a recess sized and shaped to receive a distal end of the energy delivery probe to stabilize the energy delivery probe;
wherein the elongate carrier supports the lens and is configured to translate the energy delivery probe and the lens together;
wherein the energy delivery probe is configured to rotate the energy source around the longitudinal axis to a first position away from the opening of the evacuation lumen to treat the tissue and to rotate the energy source around the longitudinal axis to a second position toward the opening to remove the tissue, the second position opposite the first position.

10. The apparatus of claim 9, wherein a distance between the energy source and the lens remains substantially fixed when the elongate carrier translates the energy delivery probe and the lens.

11. The apparatus of claim 9, wherein the lens comprises a lens of an endoscopic camera comprising a sensor array and wherein a distance between the energy source and the lens of the endoscopic camera remains substantially fixed when the elongate carrier translates the endoscopic camera and the energy source.

12. The apparatus of claim 9, wherein the energy source comprises one or more of a nozzle, an aperture, a lens, an optical fiber, an electrode, or an ultrasound array and wherein the energy comprises one or more of water jet energy, mechanical energy, laser energy, electrical energy or ultrasound energy.

13. The apparatus of claim 9, wherein the energy delivery probe is configured to rotate in relation to the elongate carrier in order to direct the energy at a rotational angle toward a target tissue.

14. The apparatus of claim 13, wherein the elongate carrier comprises stiffness to resist deflection from the energy source.

15. The apparatus of claim 14, wherein a distal end of the energy delivery probe protrudes beyond a distal end of the elongate carrier by a distance and wherein the distance remains substantially fixed when the elongate carrier translates and the energy delivery probe rotates.

16. The apparatus of claim 15, wherein the elongate carrier comprises one or more irrigation channels extending to one or more openings.

* * * * *